United States Patent [19]

Herr

[11] 4,311,554
[45] Jan. 19, 1982

[54] INCOMBUSTIBLE MATERIAL

[75] Inventor: Alfons K. Herr, Stutensee, Fed. Rep. of Germany

[73] Assignee: KATAFLOX Patentverwaltungsgesellschaft mbH., Karlsruhe, Fed. Rep. of Germany

[21] Appl. No.: 57,266

[22] Filed: Jul. 12, 1979

[30] Foreign Application Priority Data

Jul. 19, 1978 [DE] Fed. Rep. of Germany ....... 2831616

[51] Int. Cl.³ ............................................. D21H 3/74
[52] U.S. Cl. ................................. 162/159; 162/181 R; 162/181 A; 162/181 D; 162/206; 162/225; 162/DIG. 9; 428/921; 264/122
[58] Field of Search .............. 428/920, 921, 323, 326; 264/37, 330, 331, DIG. 69, 122; 162/154, DIG. 9, 181 R, 181 A, 181 D, 206, 225; 423/283

[56] References Cited

U.S. PATENT DOCUMENTS 1,888,391 11/1932 Newman ............................. 423/283
4,173,666 11/1979 Quinto ................................. 428/289

FOREIGN PATENT DOCUMENTS 957788 11/1974 Canada ......................... 162/DIG. 9
159013 12/1963 U.S.S.R. ....................... 162/DIG. 9

Primary Examiner—William F. Smith
Attorney, Agent, or Firm—Spencer & Kaye

[57] ABSTRACT

An incombustible material containing at least one mineral substance, and including a first ingredient composed of a plurality of pieces constituted by fibers of cellulose and/or chips of wood shavings, with the pieces forming a network, a mass of thermosetting synthetic resin gluing the pieces of the first ingredient together, and particles of calcium sulfate, boric acid and an at least partially glass or ceramic forming mineral adhering to the fibers and/or chips.

18 Claims, No Drawings

INCOMBUSTIBLE MATERIAL

BACKGROUND OF THE INVENTION

The present invention relates to an incombustible material produced with the use of mineral substances and to a method for producing it.

Board-shaped structural elements of gypsum, asbestos and cement, those composed of gypsum being reserved for interior use, are used in construction in ever increasing quantities. One reason for this is that the presently preferred light-weight construction methods require such structural elements.

However, the prior art materials leave much to be desired regarding their physical characteristics, in that, for example, they tend to absorb an unduly large amount of water, and to swell to a considerable degree, they are difficult to process and have insufficient strength. The rigid compression bond between the component materials here determines the relatively low bending strength of the structural elements produced therefrom. On the other hand, structural elements containing such mineral components produced according to DIN [German Industrial Standard] 4102 are completely or almost completely incombustible.

In the desire to produce board-shaped structural elements with improved physical properties, cement-bound wood chip boards and gypsum fiber boards have been developed which for the most part fall into the category of completely or almost completely incombustible construction materials.

It is also known to construct synthetic resin bound wood chip board materials which attain extremely high physical strength values by virtue of their defined chip shape and the elastic synthetic resin bond. The water absorption and swelling of such materials can thus be influenced by the selection of certain resins and additives. With respect to the burn behavior of such wood chip materials, there already exist a series of methods to provide these materials with flame protection. Therefore, some of these wood chip materials also satisfy the requirements for incombustible construction materials according to DIN 4102.

Construction materials made of fibrous, granular or flaky mineral substances, such as asbestos, mica and vermiculite, are also known. In order to improve the bond with the synthetic resin, fine wood chips have sometimes also been added to these materials. Since the mineral raw materials themselves are imcombustible, but do not actuate any flame or fire inhibiting reactions in the case of fire, only the amount of organic substances contained in these materials determines their classification as combustible or incombustible substances according to DIN 4102. It must, however, be considered, that the mineral raw materials contribute only very slightly to the physical strength of a product by their already mentioned compressive bond so that purely mineral building materials can be used only within limits.

SUMMARY OF THE INVENTION

It is an object of the present invention to provide incombustible materials which exhibit high strength values compared to prior art mineral building materials and which can also be processed easily.

This and other objects are achieved by the provision, according to the invention, of a material composed of network of cellulose fibers and/or wood shaving chips glued together by means of a thermosetting synthetic resin, and particles of calcium sulfate, boric acid and additional at least partially glass or ceramic forming minerals adhering to the fibers and/or chips. Such a material thus consists not only of mineral, incombustible materials reinforced by organic fibers, but additionally contains flame inhibiting elements, such as boric acid and at least partially glass or ceramic forming minerals.

In the case of fire, not only will there occur the known fire inhibiting effect of the boric acid, but also, as appropriate tests have confirmed, the organic components, i.e. the cellulose fibers or wood chips, are vitrified or encased in ceramic, respectively, so that they do not contribute to the fire.

Due to the elastic synthetic resin bond as well as the likewise elastic cellulose fibers or wood shaving chips, the material according to the invention exhibits very high physical strength values which also permit the structural components made of such material to be used as load-bearing members of a structure. As further confirmed by experiments, these strength values also decrease only very slowly in case of fire since the content of boric acid or the surface vitrification or ceramic formation confines the attack of the flames on the structural element at its surface.

The fact that structural elements according to the invention can be manufactured economically must also be emphasized. One significant reason for this is that machines for pressing materials incorporating thermo-setting synthetic resin already exist in large numbers and their operation is generally understood.

Finally, the method according to the invention for manufacturing such an incombustible material is very simple and economical. It is carried out by intimately mixing fiber containing residual waste water clarification sludges having a water content of up to about 80%, by weight, and originating from paper, or cardboard, making or cellulose factories and/or wet wood shaving chips of a moisture content up to about 80%, by weight, with boron minerals, by adding concentrated (96%) sulfuric acid to the above materials while continuing to mix them, introducing the resulting material into an evaporation line and subsequently combining this material with a resin and subjecting the resulting combination to selected temperature and pressure levels for causing the combined material and resin to be bonded together and to form a solid body.

When fiber containing residual waste water clarification sludges are used, the fibrous portion of structural elements made of materials according to the invention is extremely inexpensive since this is a material which has no other industrial use. Concentrated sulfuric acid is likewise a waste product, and therefore is also inexpensive for use in the above-mentioned process.

The intimate mixing of the fibers contained in the residual waste water clarification sludges or of the wood shaving chips with the boron minerals which are subsequently converted into boric acid and calcium sulfate causes the boric acid particles as well as the gypsum particles to firmly adhere to the fibers or chips, respectively. It is assumed that this occurs in such a manner that the boric acid particles and the gypsum particles cover the surface of the fibers or chips only in a dot-shaped pattern. The same also applies for the other minerals which already adhere to these fibers from the preceding paper, or cardboard, or cellulose manufacture. This leaves sufficient free fiber surfaces or chip surfaces which are reached by the synthetic resin to produce a reliable bond between the fiber or chip network, which should be decisive for attaining the desired high physical strength values.

According to a further feature of the present invention, wood fibers and saw dust may be mixed in with the fiber-containing residual waste water clarification sludges and the wood shaving chips, thus producing not only a further increase in the strength values but also employing another otherwise useless material to great advantage.

The boron mineral preferably employed is colemanite; this mineral earth is relatively inexpensive and is quite will suited for practicing the method according to the present invention. The resin employed according to the present invention is preferably a condensed synthetic resin, preferably urea and melamine resin, or isocyanate adhesive and thermoplastic synthetic resin adhesive.

Depending on the amount of materials added, it may be advisable to dry the mixture before employing the adhesive in order to obtain the desirable moisture content of between 3 and 10% by weight. Moreover, it may also be advisable to comminute the mixture in a mill, preferably an impact pulverizer, before adding the adhesive in order to break up possibly existing granules which are too large and which would be held together only by a compression bond.

DESCRIPTION OF THE PREFERRED EMBODIMENTS

The invention will be explained in detail with the aid of a few examples:

EXAMPLE 1

The following quantities of material were introduced into a turbine mixer: 15.0 kg of shaving chips of pine wood of a thickness of 0.35-0.40 mm and a residual moisture content of about 5% by weight; 90 kg of residual waste water clarification sludge originating from a fine paper making factory and having a solids content of about 33% by weight and of approximately the following composition:
66% by weight cellulose, in the form of cellulose fibers;
18% by weight $SiO_3$;
12% by weight $Al_2O_3$, and
4% by weight CaO;
and 85.0 of colemanite.
These ingredients were mixed well for 4 to 5 minutes.

Thereafter, while the mixer continued to run, 49.0 kg of concentrated sulfuric acid (96%) were sprayed into the mixer during a period of 1 to 2 minutes, and the mixture was homogenized for an additional 2 minutes, resulting in a granular product. This granular product was evaporated and cooled, during a period of 10 minutes, then dried further to a residual moisture content of 3 to 5%, then transported to a gluing system of a type usually employed in the chip board industry, where it is glued with a mixture of glue containing approximately 55% solid resin so that 11 to 12% solid resin are applied with respect to the total weight of all ingredients, and are then shaped and hot pressed in a manner which is customary in the manufacture of wood chip boards.

The resulting board-shaped material has such strength values that it can be used for load-carrying, load supporting or reinforcing purposes in the construction industry and also in shipbuilding and for chassis construction. The material can be worked extremely well with conventional woodworking tools in the same manner as wood. It can be smoothed, cut, drilled, nailed, glued and veneered or otherwise coated.

It is of particular significance that this material, although it consists mainly of mineral substances, can be produced to have specific weights which lie below 1000 $kg/m^3$.

EXAMPLE 2

436 kg of shaving chips of pine wood, of a thickness of 0.35-0.40 mm and 1734 g of "fire protective fibers" formed by mixing residual waste clarification sludge from fine papermaking with a boron mineral and concentrated (96%) sulfuric acid, and having the following composition:
28.0% by weight cellulose, in the form of cellulose fibers
34.8% by weight $H_3BO_3$,
13.8% by weight CaO, and
22.5% by weight $SO_3$
are mixed in a fast running turbomixer, 260 g of a glue mixture being added simultaneously. The glue mixture has the following composition:
250 g raw glue (urea resin 60%),
16 g paraffin emulsion (50%), (8 g paraffin, 8 g water)
26 g hardener solution (20%) (5.2 g ammonium chloride and 20.8 g water) and
18 g water The mixture when finished for processing has a moisture content of 14.7%. In a scattering frame, 1050 g of this mixture are scattered to form a cake which is then pressed into a board in a heatable hydraulic press having dimensions of 26×26 cm with the addition of spacer strips 16 mm thick. The following pressures are used in the order stated, at a pressing temperature of 420° K.:
for 2 minutes—3.15 $N/mm^2$
for 4.5 minutes—1.40 $N/mm^2$, and
for 0.5 minute—0.56 $N/mm^2$.

Thus an incombustible mineral construction board of high strength is produced in a conventional wood chip board producing system; the high strength is attained by the reinforcement with wood chips and cellulose fibers or by the synthetic resin bond, respectively.

The fire protecting fibers are produced for example in the following manner:

Into a turbine mixer are introduced in each charge 120 kg of residual waste water sludge from finepaper manufacture with a content of solid materials of about 33% of weight (content of moisture 67% of weight) and 172 kg colemanite with 45% of weight boric oxide (boric trioxide) and this is mixed for 4 minutes. While the mixing continues, 73 kg sulfuric acid are sprayed during 1 minute into the mixer and the entire mixture homogenized for another 2 minutes. Then the mixture is discharged to an evaporation line. A granulate results which has a residual moisture content of less than 20% of weight of water. In this form the granulate is introduce into an impact pulverizer and there separated into a fibrous substance which can be dried further to the desired moisture content of 2 to 5% of weight.

The result is a fireprotection-fiber in which boric acid and calcium sulphate, as well as materials required in the manufacture of finepaper and materials present in the original sludge, i.e. silicic acid, aluminia magnesia silicate and lime, adhere to the fibers.

EXAMPLE 3

In a turbomixer, 25 kg of shaving chips of pine wood and 20 kg of wood fibers and wood dust having a moisture content of 40% as well as 85 kg of colemanite are mixed for 2 to 3 minutes. Thereafter, 49 kg of concentrated sulfuric acid (96%) are sprayed onto the mixture for 1 to 2 minutes in the running mixer and the mixture is mixed further for approximately another 1 to 2 minutes. The mixture heats up to about 373° K. or more so that the drying process is initiated already in the mixer. The mixture is then discharged onto an evaporation line and, if necessary, is dried by the addition of more heat to 10 to 12% residual water content. This mixture is now gently ground in order to homogenize it and can then, if necessary, be dried some more to a residual water content of 3 to 5%. Thereafter it is brought into a gluing system of a type typically employed in the chipboard industry, and is coated with synthetic resin glue in an amount such that, when absolutely dry, it constitutes 9-11%, by weight, of the product.

Then the resulting composition is shaped into boards or molded bodies and pressed in the conventional manner under pressure and heat into the desired final form.

When this method is used, the resulting boards or molded bodies have a high mechanical strength and excellent, long-lasting fire protection. With such a board material, final products can be manufactured which, according to DIN 4102, can be grouped in the category of incombustible building materials.

Of course, instead of board-shaped structural elements, it is always possible to manufacture molded bodies of the materials defined in the Examples. These molded bodies, as well as the board-shaped structural elements, can also be laminated in a known manner already during pressing.

Suitable glass or ceramic-forming minerals which can be incorporated in products according to the invention include silicate of alumina, kaolins, talc, powdered chalk and titanium dioxide, which are carried by fibers contained in residual waste water clarification sludges generated during industrial manufacture of paper, cardboard or cellulose, which minerals also serve fire protection purposes.

The mineral substance, i.e. calcium sulphate develops out of reaction from boron mineral with the sulfuric acid.

Glass or ceramic forming material could be: kaolin and silicate (silicate of alumina) together with sodium carbonate and especially boric acid as flux additive.

EXAMPLE 4

Into a turbine mixer were introduced 162 kg residual waste water clarification sludge from finepaper manufacture having the composition:
55.0% of weight cellulose and
45.0% of weight kaolin, china clay, porcelain clay, titanium oxide, silicate of alumina, a.o. and
85 kg colemanite. The residual waste water clarification sludge contains 60% of weight water. These ingredients are mixed well for 2 to 3 minutes and homogenized in this time.

Thereafter, while the mixer continues to run, 49.0 kg of concentrate sulfuric acid (96%) were sprayed into the mixer during a period of 1 to 2 minutes, than the mixture homogenized for additional 1 to 2 minutes.

The mixture heats itself to about 350 K or more, so that the process of drying begins in the mixer. The mixture now is evaporated and cooled, during a period of 4 to 6 minutes to a residual moisture content of 10 to 12% of weight residual water. The form of material is a granulate. This granulate can thus generally be introduced into an impact pulverizer without further drying and changed into a fibrous substance which can be dried further to the desired residual moisture content of 2 to 5% of weight, if building boards are to be produced from this material which are glued with urea formaldehyde or melamin resin. If the boards are to be glued with isocyanate resin, residual water content of the solid matter can stay at 10 to 12% of weight.

The fibers then are transported to a gluing system of a type usually employed in the chip board industry, where they are glued with a mixture of glue containing approximately 55% of weight solid resin, and are then shaped and hot pressed in a manner which is usual in the manufacture of wood chip boards.

The resulting board shaped has the same characteristic feature quality as the materials described in the other Examples 1 to 3.

The necessary fibers are taken from residual waste water sludge of the paper-, cellulose-, cardboard- or board industry but also from communal waste water. These sludges should have more than 33% of weight fibrous solid materials and more than 1% of weight but less than 60% of weight of minerals.

Boron materials which can be used include especially colemanite and rasorite, but also boracide, borax, pandernit and ulexite.

The relation between water and solid materials of the sludges should be more than 50% of weight water, more than 17.5% of weight fibers, the remainder containing minerals.

The manufacturing method according to the invention produces good results with the following quantities of materials:
less than 20% of weight wood chips,
less than 13% of weight cellulose fibers,
more than 50% of weight, but less than 70% of weight boron mineral,
more than 28% of weight, but less than 32% of weight sulfuric acid (96%),
more than 8% of weight, but less than 15% of weight lime.

It will be understood that the above description of the present invention is susceptible to various modifications, changes and adaptations, and the same are intended to be comprehended within the meaning and range of equivalents of the appended claims.

What is claimed is:

1. Method for producing an incombustible material containing at least one mineral substance, said incombustible material comprising a first ingredient including a plurality of pieces comprising fibers of cellulose and/or chips of wood shavings; a mass of thermosetting synthetic resin gluing the pieces of said first ingredient together; and particles of calcium sulfate, boric acid and an at least partially glass or ceramic forming mineral adhering to said fibers and/or chips, said method comprising: (1) forming a mixture containing an at least partially glass or ceramic forming mineral, said step of forming including providing a quantity of the first ingredient having a water content up to about 80 percent by weight and intimately mixing that quantity of the first ingredient with boron minerals which react with sulfuric acid to form calcium sulfate and boric acid; (2) adding thereto, while continuing the mixing, concentrated sulfuric acid; (3) subjecting the resulting mixture to evaporation; and (4) subsequently combining the resulting product with resin and then bonding the product and resin into a solid body by applying pressure and heat to set the resin and obtain said incombustible material with the pieces of cellulose fibers and/or wood shaving chips being in the form of a network.

2. Method as defined in claim 1 wherein said quantity of the first ingredient is a fiber-containing residual waste water clarification sludge originating from paper or cellulose manufacture.

3. Method as defined in claim 1 or 2 wherein the first ingredient includes wood shaving chips.

4. Method as defined in claim 1 further comprising adding wood fibers and sawdust to the first ingredient.

5. Method as defined in claim 4 wherein the wood fibers and the sawdust are moistened before being added.

6. Method as defined in claim 1 wherein the boron mineral is colemanite which has a boron content greater than 42 percent by weight.

7. Method as defined in claim 2 wherein the resin is a synthetic resin glue which is hardenable by continuation of a polycondensation reaction.

8. Method as defined in claim 1 wherein the resin is an isocyanate adhesive.

9. Method as defined in claim 1 wherein the resin is a thermoplastic synthetic resin adhesive.

10. Method as defined in claim 1 further comprising drying the resulting mixture before said step of combining the resulting product with a resin.

11. Method as defined in claim 1 further comprising comminuting the resulting mixture in a mill before said step of combining the resulting product with a resin.

12. Method as defined in claim 1 wherein the sulfuric acid has a concentration of 96%.

13. Method as defined in claim 2 wherein said sludge additionally contains said at least partially glass or ceramic forming mineral.

14. Method as defined in claim 1, wherein said quantity of the first ingredient contains from about 40% water up to about 80% water.

15. Method as defined in claim 1, wherein said quantity of the first ingredient contains about 40% water.

16. Method as defined in claim 1 or 2, wherein said quantity of the first ingredient contains about 60% water.

17. Method as defined in claim 1 or 2, wherein said quantity of the first ingredient contains about 67% water.

18. Method as defined in claim 2, wherein said quantity of the first ingredient contains at least 50% water.

* * * * *